(12) United States Patent
Talreja et al.

(10) Patent No.: US 10,913,842 B2
(45) Date of Patent: Feb. 9, 2021

(54) FORMULATION OF ELASTOMER COPOLYMER AND BLOCK COPOLYMER

(71) Applicant: Dow Global Technologies LLC, Midland, MI (US)

(72) Inventors: Manish Talreja, Lansdale, PA (US); Jeffrey M. Cogen, Flemington, NJ (US); Haiyang Yu, Shanghai (CN); Jeffrey C. Munro, Bellaire, TX (US); Lisa S. Madenjian, Lake Jackson, TX (US); Susan R. Gill, Jamison, PA (US)

(73) Assignee: Dow Global Technologies LLC, Midland, MI (US)

( * ) Notice: Subject to any disclaimer, the term of this patent is extended or adjusted under 35 U.S.C. 154(b) by 46 days.

(21) Appl. No.: 16/332,100

(22) PCT Filed: Sep. 28, 2016

(86) PCT No.: PCT/CN2016/100466
§ 371 (c)(1),
(2) Date: Mar. 11, 2019

(87) PCT Pub. No.: WO2018/058344
PCT Pub. Date: Apr. 5, 2018

(65) Prior Publication Data
US 2019/0359809 A1    Nov. 28, 2019

(51) Int. Cl.
| | | |
|---|---|---|
| *C08L 23/16* | (2006.01) |
| *C08L 23/08* | (2006.01) |
| *C08L 23/12* | (2006.01) |
| *C08L 53/00* | (2006.01) |
| *C08K 3/016* | (2018.01) |
| *C08F 210/06* | (2006.01) |
| *C08F 210/16* | (2006.01) |
| *C08J 3/22* | (2006.01) |
| *C08K 3/04* | (2006.01) |
| *C08K 3/22* | (2006.01) |
| *C08K 5/00* | (2006.01) |
| *C08K 5/3492* | (2006.01) |
| *C08K 5/521* | (2006.01) |

(52) U.S. Cl.
CPC ............ *C08L 23/16* (2013.01); *C08F 210/06* (2013.01); *C08F 210/16* (2013.01); *C08J 3/226* (2013.01); *C08K 3/016* (2018.01); *C08K 3/04* (2013.01); *C08K 3/22* (2013.01); *C08K 5/005* (2013.01); *C08K 5/0066* (2013.01); *C08K 5/3492* (2013.01); *C08K 5/521* (2013.01); *C08L 23/0815* (2013.01); *C08L 23/12* (2013.01); *C08L 53/00* (2013.01); *C08K 2003/2296* (2013.01); *C08L 2203/20* (2013.01); *C08L 2310/00* (2013.01)

(58) Field of Classification Search
CPC ....................................................... C08L 53/00
See application file for complete search history.

(56) References Cited

U.S. PATENT DOCUMENTS

| | | | |
|---|---|---|---|
| 9,056,973 B2 | 6/2015 | Yu et al. | |
| 9,336,927 B2 | 5/2016 | Sun et al. | |
| 2011/0306715 A1 | 12/2011 | Batra et al. | |
| 2011/0311792 A1* | 12/2011 | Batra ........................ | B32B 7/06 428/213 |
| 2012/0261163 A1* | 10/2012 | Tai ........................... | C08L 23/14 174/136 |
| 2013/0237655 A1* | 9/2013 | Chen ........................ | C08J 3/005 524/291 |
| 2014/0017490 A1* | 1/2014 | Forloni ................... | B32B 27/32 428/354 |
| 2014/0288225 A1 | 9/2014 | Shipley et al. | |
| 2015/0038629 A1* | 2/2015 | Ultsch .................... | B32B 27/12 524/436 |
| 2015/0259524 A1 | 9/2015 | Batra et al. | |
| 2016/0017133 A1* | 1/2016 | Chen ......................... | C08J 5/18 525/227 |

FOREIGN PATENT DOCUMENTS

| | | |
|---|---|---|
| CN | 103756124 | 4/2014 |
| CN | 105037961 | 11/2015 |
| EP | 2521753 B1 | 1/2016 |
| EP | 2831171 B1 | 5/2016 |
| EP | 2890738 | 5/2018 |
| EP | 2643408 B1 | 7/2018 |
| WO | 2011079457 | 7/2011 |
| WO | 2011159435 | 12/2011 |
| WO | 2014000230 | 1/2014 |
| WO | WO 2014/101154 A1 * | 7/2014 |
| WO | 2018058344 | 4/2018 |

OTHER PUBLICATIONS

Arriola, Catalytic Production of Olefin Block Copolymers via Chain Shuttling Polymerization, Science, May 5, 2006, 714-719, 312, American Association for the Advancement of Science, New York, NY.

(Continued)

*Primary Examiner* — Jeffrey C Mullis

(57) ABSTRACT

A formulation of a poly(propylene-co-ethylene) elastomer copolymer and a poly(ethylene-co-1-octene) block copolymer; a method of making the formulation; a manufactured article comprising or made from the formulation; and a method of using the manufactured article.

12 Claims, No Drawings

(56) References Cited

OTHER PUBLICATIONS

The Dow Chemical Company, Infuse Olefin Block Copolymers, Product Selection Guide, 2015, 1-4, United States.
Sexton, Plastics Innovation From Dow, Paper presented at 'International Polyolefins 2004', 2004, 1-8, United States.
Dow Chemical Thailand, Infuse 9010 Olefin Block Copolymer, Safety Data Sheet, Jun. 22, 2016 1-9, Thailand.
The Dow Chemical Company, Infuse Olefin Block Copolymers, Quick Reference Guide, 1-2, United States.
The Dow Chemical Company, Versify Plastomers and Elastomers, Product Selection Guide, Apr. 2014, 1-4, United States.
The Dow Chemical Company, Versify Plastomers and Elastomers Specialty Propylene-Ethylene Copolymers, Brochure, 2007, 1-3, United States.
Braskem, Polypropylene, Products and Properties America, Brochure, Dec. 2013, 1-16, United States.

* cited by examiner

FORMULATION OF ELASTOMER COPOLYMER AND BLOCK COPOLYMER

TECHNICAL FIELD

This invention generally relates to a formulation comprising a poly(propylene-co-ethylene) elastomer copolymer and a poly(ethylene-co-alpha-olefin) block copolymer; a method of making the formulation; a manufactured article comprising or made from the formulation; and a method of using the manufactured article.

INTRODUCTION

A variety of poly(propylene-co-ethylene) elastomer copolymers having an isotactic segment distribution are made and sold by The Dow Chemical Company under the VERSIFY™ brand. A variety of poly(ethylene-co-alpha-olefin) block copolymers having alternating blocks of hard segments (semi-crystalline; high crystallinity character; high melting temperature, $T_m$, as described later) and soft segments (amorphous to low crystallinity character; low $T_m$; and low glass transition temperature ($T_g$), as described later) are sometimes generally called ethylene/alpha-olefin interpolymers or olefin block copolymers and are made and sold by The Dow Chemical Company under the INFUSE™ brand.

WO 2011/079457 A1 to X. Tai, et al. relates to halogen-free, flame retardant thermoplastic compositions for wire and cable applications. The compositions are based on polypropylene and one or more thermoplastic elastomers with an organic nitrogen- and/or phosphorus-based intumescent flame retardant comprising a piperazine component. The composition is processed easily to make a wire and cable sheath exhibiting a balance of high flame retardancy, good flexibility, high wet electrical resistance and excellent heat deformation properties, and which passes the VW-I flame retardancy test, the UL1581 heat deformation test at 150° C. and the wet electrical resistance test, and also exhibits good tensile and flexibility properties. Also disclosed is a wire and cable sheath made from the composition.

US 2014/0288225 A1 to K. Shipley, et al. relates to polypropylene compounds with enhanced haptics. There is a polymeric composition that is a formulation of one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene; one or more additional elastomeric components selected from the group of an ethylene/α-olefin C3-C20 copolymer with a total ethylene concentration of greater than or equal to 65% by weight; and a propylene/α-olefin C2, C4-C20 copolymer with a total propylene concentration of greater than or equal to 65% by weight; 5-65% by weight of the total composition of one or more inorganic or organic reinforcement materials; and 0.01-4% by weight of the total composition of a maleic anhydride grafted polypropylene compatibilizer or coupling agent. The polymeric composition has a low crystallinity of less than 30 J/gram measured by DSC. The total elastomer content of the polymeric composition is greater than 50% by weight, and the overall polymeric composition has an ethylene concentration of greater than 10% by weight.

SUMMARY

We (the present inventors) have discovered that poly(propylene-co-ethylene) elastomer copolymers and poly(ethylene-co-1-octene) block copolymers separately have insufficient stiffness for certain applications. We have conceived a technical solution to this problem that includes a formulation comprising a poly(propylene-co-ethylene) elastomer copolymer and a poly(ethylene-co-1-octene) block copolymer. The formulation unexpectedly has increased stiffness over a mass-weighted average of the stiffness of the poly(propylene-co-ethylene) elastomer copolymer and the stiffness the poly(ethylene-co-1-octene) block copolymer. Also conceived is a method of making the formulation; a manufactured article comprising or made from the formulation; and a method of using the manufactured article.

DETAILED DESCRIPTION

The Brief Summary and Abstract are incorporated here by reference. Examples of embodiments include the following numbered aspects.

Aspect 1. A formulation comprising constituent (A) a poly(propylene-co-ethylene) elastomer copolymer having an isotactic segment distribution and constituent (B) a poly(ethylene-co-1-octene) block copolymer having alternating blocks of hard segments (semi-crystalline; high glass transition temperature, $T_g$, as described later) and soft segments (amorphous; low $T_g$, as described later), wherein the formulation has a greater 5%-secant modulus than a mass-weighted average of 5%-secant modulus of the (A) poly(propylene-co-ethylene) elastomer and 5%-secant modulus of the (B) poly(ethylene-co-1-octene) block copolymer, when tested according to 5%-Secant Modulus Test Method, described later.

Aspect 2. The formulation of aspect 1 wherein: (i) the (A) poly(propylene-co-ethylene) elastomer copolymer has a total ethylene-based content of from 1 wt % to 15 wt % based on weight of the poly(propylene-co-ethylene) elastomer copolymer; (ii) the (A) poly(propylene-co-ethylene) elastomer copolymer is has a melt flow rate (MFR) of 0.2 to 3 decigrams per minute (dg/min) as measured by ASTM D1238 (230 degrees Celsius (° C.) per 2.16 kilograms (kg)) and a density of 0.855 to 0.875 grams per cubic centimeter (g/cc) as measured by ASTM D792; (iii) both (i) and (ii); (iv) the (B) poly(ethylene-co-1-octene) block copolymer has a total ethylene-based content of from 59 wt % to 75 wt % based on weight of the (B) poly(ethylene-co-1-octene) block copolymer and the (B) poly(ethylene-co-1-octene) block copolymer comprises 8 wt % to 30 wt % of a hard segment and 92 wt % to 70 wt % of a soft segment, wherein the soft segment has a 1-octene-based content of from 8 mole percent (mol %) to 20 mol % based on total moles of the monomer-based content of the soft segment; (v) the (B) poly(ethylene-co-1-octene) block copolymer has a melt index (MI) of 0.2 grams/10 minutes (g/10 min) to 2 g/10 min as measured by ASTM D1238 (190° C. per 2.16 kg) and a density of 0.870 to 0.890 g/cc as measured by ASTM D792; (vi) both (iv) and (v); or (vii) both (iii) and (vi). In some aspects constituent (A) has MFR of 1.5 to 2.4 dg/min, alternatively 1.9 to 2.1 dg/min, alternatively 2 dg/min; a density from 0.855 to 0.865 g/cc; or both. In some aspects constituent (B) has a MI of 0.5 g/10 min; 10 wt % to 20 wt %, alternatively 10 wt % to 15 wt % of a hard segment and 90 wt % to 80 wt %, alternatively 90 wt % to 85 wt % of a soft segment; 12 to 14 mol %, alternatively 13 mol %, 1-octene-based content in the soft segment; total ethylene-based content from 65 to 70 wt %; and/or a density of 0.870 to 0.880 g/cc. In some aspects constituents (A) and (B) are as described immediately above in their respective "some aspects".

Aspect 3. The formulation of aspect 1 or 2 wherein: (i) the (A) poly(propylene-co-ethylene) elastomer copolymer is from 1 weight percent (wt %) to 99 wt %, and the (B) poly(ethylene-co-1-octene) block copolymer is from 99 wt % to 1 wt %, respectively, of the combined weight of the constituents (A) and (B); (ii) the (A) poly(propylene-co-ethylene) elastomer copolymer is from 10 wt % to 90 wt %, and the (B) poly(ethylene-co-1-octene) block copolymer is from 90 wt % to 10 wt %, respectively, of the combined weight of the constituents (A) and (B); (iii) the (A) poly(propylene-co-ethylene) elastomer copolymer is from 20 wt % to 80 wt %, and the (B) poly(ethylene-co-1-octene) block copolymer is from 80 wt % to 20 wt %, respectively, of the combined weight of the constituents (A) and (B); or (iv) the poly(propylene-co-ethylene) elastomer copolymer is from 25 wt % to 75 wt %, and the poly(ethylene-co-1-octene) block copolymer is from 75 wt % to 25 wt %, respectively, of the combined weight of the constituents (A) and (B).

Aspect 4. The formulation of any one of aspects 1 to 3 further comprising a constituent (C) a heterophasic polypropylene material and/or a constituent (D) at least one additive, wherein in embodiments of the formulation that are free of (lack) the constituent (D) and further comprise the constituent (C), the (C) heterophasic polypropylene material is from 1 wt % to 40 wt % of the formulation; and wherein in embodiments of the formulation that further comprise both the constituents (C) and (D), the (C) heterophasic polypropylene material is from 15 wt % to 35 wt % of the formulation and the (D) at least one additive is from 0.01 wt % to 40 wt % of the formulation; and wherein in embodiments of the formulation that are free of (lack) the constituent (C) and further comprise the constituent (D), the (D) at least one additive is from 0.01 wt % to 80 wt % of the formulation; wherein each wt % is based on total weight of the formulation.

Aspect 5. The formulation of aspect 4 wherein the (C) heterophasic polypropylene material comprises (C1) a poly(ethylene-co-propylene) elastomer copolymer dispersed in a homopolypropylene matrix, wherein the poly(ethylene-co-propylene) elastomer copolymer is from 5 to 30 wt % (e.g., 10 wt % to 15 wt %) of the (C1) heterophasic polypropylene material; and/or wherein the (D) at least one additive is selected from: (D1) an intumescent flame retardant and/or (D2) a flame retardant enhancer, at a total concentration from 0.1 wt % to 70 wt %; (D3) at least one hindered amine light stabilizer (HALS) at a total concentration from 0.01 wt % to 10 wt %; (D4) at least one ultraviolet (UV) light absorbent filler at a total concentration from 0.1 wt % to 10 wt %; (D5) at least one antioxidant selected from (D5a) a sterically hindered phenol, (D5b) a metal deactivating sterically hindered phenol, (D5c) a heat stabilizer/sterically hindered phenol, and (D5d) a triarylphosphite, wherein each of the (D5a) to (D5d) independently is at a total concentration from 0.01 wt % to 3 wt %; (D6) at least one processing aid at a total concentration from 0.01 wt % to 5 wt %; and (D7) each of (D1) to (D6). As above, total concentration is based on total weight of the formulation.

Aspect 6. The formulation of aspect 5 wherein in the (D) at least one additive: the (D1) the intumescent flame retardant is a combination of (D1a) piperazine pyrophosphate and (D1b) phosphoric acid and the (D2) flame retardant enhancer is (D2a) zinc oxide; (D3) the at least one HALS is (D3a) N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N'N''-dibutyl-N'N''-bis(1,2,2,6,6-pentamethyl-4-piperidinyl)-1,3,5-triazine-2,4,6-triamine (CAS No. 106990-43-6); (D4) the at least one UV light absorbent filler is (D4a) titanium dioxide and/or (D4b) a carbon black; (D5) the at least one antioxidant is selected from (D5a-1) pentaerythritol tetrakis(3-(3,5-di-tert-butyl-4-hydroxyphenyl)propionate, (D5b-1) 2',3-bis[[3-[3,5-di-tert-butyl-4-hydroxyphenyl]propionyl]]propionohydrazide, (D5c-1) a combination of dioctadecyl 3,3'-thiodipropionate and a tetrakis(3-(3,5-di-tert-butyl-4-hydroxyphenyl)propionate, and (D5d-1) tris(2,4-di-tert-butylphenyl)phosphite; (D6) the at least one processing aid is (D6a) a fluorothermoplastic; (D7a) each of (D1a), (D1b), (D2a), (D3a), (D4a), (D4b), (D5a-1) to (D5d-1), and (D6a); and wherein the total amount of constituent (D) at least one additive is from 30 to 40 wt % of the formulation.

Aspect 7. The formulation of aspect 6 wherein the (D4b) carbon black is (D4b-1) a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the masterbatch); and/or wherein the total amount of the (D) at least one additive is from 35 to 37 wt % based on total weight of the formulation.

Aspect 8. The formulation of any one of aspects 1 to 7 wherein: (i) the 5%-secant modulus of the formulation is at least 5 percent (%) greater than the mass-weighted average of 5%-secant modulus of the (A) poly(propylene-co-ethylene) elastomer copolymer and 5%-secant modulus of the (B) poly(ethylene-co-1-octene) block copolymer; (ii) the 5%-secant modulus of the formulation is at least 10% greater than the mass-weighted average of 5%-secant modulus of the (A) poly(propylene-co-ethylene) elastomer copolymer and 5%-secant modulus of the (B) poly(ethylene-co-1-octene) block copolymer; (iii) the 5%-secant modulus of the formulation is at least 20% greater than the mass-weighted average of 5%-secant modulus of the (A) poly(propylene-co-ethylene) elastomer copolymer and 5%-secant modulus of the (B) poly(ethylene-co-1-octene) block copolymer; (iv) the 5%-secant modulus of the formulation is at least 30% greater than the mass-weighted average of 5%-secant modulus of the (A) poly(propylene-co-ethylene) elastomer copolymer and 5%-secant modulus of the (B) poly(ethylene-co-1-octene) block copolymer; (v) the 5%-secant modulus of the formulation is at most 35% greater than the mass-weighted average of 5%-secant modulus of the (A) poly(propylene-co-ethylene) elastomer copolymer and 5%-secant modulus of the (B) poly(ethylene-co-1-octene) block copolymer; (vi) both (v) and any one of (i) to (iv).

Aspect 9. A method of making a formulation having an enhanced 5%-secant modulus, the method comprising (1) melting and mixing constituent (A) a poly(propylene-co-ethylene) elastomer copolymer having an isotactic segment distribution and constituent (B) a poly(ethylene-co-1-octene) block copolymer having alternating blocks of hard segments and soft segments, and optionally constituent (C) a heterophasic polypropylene material and/or a constituent (D) at least one additive, to give a melt of constituents (A) and (B) and, optionally, constituent (C), and optionally filled with constituent (D) at least one additive; and (2) allowing the melt to cool to give a formulation comprising the constituents (A) and (B), and optionally the constituent (C) and/or constituent (D), wherein the formulation has a greater 5%-secant modulus than a mass-weighted average of 5%-secant modulus of the (A) poly(propylene-co-ethylene) elastomer copolymer and 5%-secant modulus of the (B) poly (ethylene-co-1-octene) block copolymer, when tested according to 5%-Secant Modulus Test Method.

Aspect 10. A manufactured article comprising a shaped form of the formulation of any one of aspects 1 to 8 or the formulation made by the method of aspect 9.

Aspect 11. A coated conductor comprising a conductive core and a polymeric layer at least partially surrounding the conductive core, wherein at least a portion of the polymeric layer comprises or is prepared from the formulation of any one of aspects 1 to 8 or the formulation made by the method of aspect 9.

Aspect 12. A method of conducting electricity, the method comprising applying a voltage across the conductive core of the coated conductor of aspect 11 so as to generate a flow of electricity through the conductive core.

Advantageously, we discovered that the formulation comprising the poly(propylene-co-ethylene) elastomer copolymer having an isotactic segment distribution and the poly(ethylene-co-1-octene) block copolymer having alternating blocks of hard segments (semi-crystalline; high Tg) and soft segments (amorphous; low Tg) has an unpredictable increase in stiffness relative to a mass-weighted average of stiffness of the poly(propylene-co-ethylene) elastomer and stiffness of the poly(ethylene-co-1-octene) block copolymer. Prior to our invention a skilled artisan would have expected such a formulation to have a stiffness equal to the weight average. Further, we surprisingly found that the increase in stiffness is proportional to the concentration of the poly(ethylene-co-1-octene) block copolymer, which is the softer, more flexible constituent of the formulation than the constituent (A) or (C). That is, all other things being equal, the higher the amount of the poly(ethylene-co-1-octene) block copolymer in the formulation relative to the amount of the poly(propylene-co-ethylene) elastomer copolymer in the formulation, the greater the increase in stiffness. We also discovered that the synergistic or enhanced increase in stiffness of the formulation may be further enhanced or increased by replacing a portion of the poly(propylene-co-ethylene) elastomer copolymer and the poly(ethylene-co-1-octene) block copolymer in the formulation with polypropylene, alternatively with a heterophasic polypropylene material. This further enhancement with polypropylene, a harder, less flexible constituent than the foregoing portions of the constituents (A) and (B) it replaces, also was unpredictable.

The increased stiffness may be characterized by any suitable test method. In some aspects such as the above numbered aspects, the increased stiffness is characterized by the 5%-Secant Modulus Test Method. In the working examples described later, the increased stiffness is referred to as "Stiffness Enhancement".

5%-Secant Modulus Test Method. Conduct the 5%-Secant Modulus Test Method according to WO 2011/159435 A1: conduct testing on INSTRON RENEW 4201 65/16 and 4202 65/16 apparatus using a special 2-speed protocol to provide 5%-secant modulus, followed by tensile and elongation at break measurements. Use a time-based displacement method to determine the secant modulus strain levels to eliminate difficulties with extensometer slippage and poor resolution at the low extension levels used for modulus testing. For ASTM Type IV dog-bone, assume strain occurs over a 2.0" (50 mm) effective length. Therefore, a 1% strain increment corresponds to a 0.50 mm jaw movement. At a test speed of 50 mm/minute, this strain level equals 0.01 minutes=0.6 second. To eliminate "start-up" noise and pre-tension in test specimens, calculate 5%-secant modulus with a "starting load" at 0.4 second, with 1% load measurements at 1 second, 2% load measurements at 1.6 seconds, and 5% load measurements at 3.4 seconds. The 1% secant load equals the 1 second load minus the 0.4 second load; the 2% secant load equals the 1.6 second load minus the 0.4 second load; and the 5% secant load equals the 3.4 seconds load minus the 0.4 second load. This load is then used in the standard secant modulus calculation; e.g., 5% secant modulus=(5% secant load) measured specimen cross-sectional area). At 18 seconds (30% elongation), automatically increase testing speed to 500 mm/min, then complete the tensile test to the break portion.

Constituent (A) poly(propylene-co-ethylene) elastomer copolymer having an isotactic segment distribution. In some aspects constituent (A) comprises a mixture of 85 wt % to 90 wt % (e.g., 88 wt %) of the poly(propylene-co-ethylene) elastomer copolymer having isotactic segment distribution and 15 wt % to 10 wt %, respectively, (e.g., 12 wt %) of a random poly(propylene-co-ethylene) copolymer having an ethylene-based content of about 3.0 to 3.5 wt %. In some aspects the (A) poly(propylene-co-ethylene) elastomer copolymer is (A1) DE 2400.05, which is commercially available from The Dow Chemical Company, Midland, Mich., USA. DE 2400.05 is an example of the (A) poly(propylene-co-ethylene) elastomer copolymer that has a total ethylene-based content of 12 wt % based on weight of the poly(propylene-co-ethylene) elastomer copolymer, a MFR of 2 grams per 10 minutes (g/10 min) as measured by ASTM D1238 (230 degrees Celsius (° C.) per 2.16 kilograms (kg)), and a density of 0.863 g/cc as measured by ASTM D792.

Constituent (B) poly(ethylene-co-1-octene) block copolymer having alternating blocks of hard segments (semi-crystalline; high $T_g$) and soft segments (amorphous; low Tg). In some aspects the (B) poly(ethylene-co-1-octene) block copolymer is (B1) OBC-3 described in paragraph [0134] of US 2011/0306715 A1 to A. Batra, et al. OBC-3 is sold as INFUSE™ 9010 by The Dow Chemical Company. OBC-3 is an example of the (B) poly(ethylene-co-1-octene) block copolymer that has a total ethylene-based content of from 68 wt % based on weight of the (B) poly(ethylene-co-1-octene) block copolymer and comprises 11 wt % of a hard segment and 89 wt % of a soft segment, wherein the soft segment has a 1-octene-based content of 13 mol % based on total moles of the monomer-based content of the soft segment; and has a MI of 0.5 g/10 min as measured by ASTM D1238 (190° C. per 2.16 kg) and a density of 0.877 g/cc as measured by ASTM D792. OBC-3 may have 32 wt % of total 1-octene-based content.

Constituent (C) heterophasic polypropylene material. In some aspects (C) is the (C1) heterophasic polypropylene material comprising a poly(ethylene-co-propylene) elastomer copolymer dispersed in a homopolypropylene matrix, wherein poly(ethylene-co-propylene) elastomer copolymer is from 10 wt % to 15 wt % of the heterophasic polypropylene material. In some aspects the heterophasic polypropylene material is KN-501, which is commercially available from Braskem S. A., Sao Paulo, Brazil.

Constituent (D) at least one additive. In some aspects (D) is any flame retardant. In some aspects the (D1) an intumescent flame retardant and/or (D2) a flame retardant enhancer is at a total concentration from 1 wt % to 60 wt %, alternatively from 1 wt % to 40 wt %; (D3) at least one HALS is at a total concentration from 0.05 wt % to 5 wt %, alternatively 0.1 wt % to 3 wt %; (D4) at least one ultraviolet (UV) light absorbent filler at a total concentration from 0.05 wt % to 5 wt %, alternatively 0.1 wt % to 3 wt %; (D5) at least one antioxidant selected from (D5a) a sterically hindered phenol, (D5b) a metal deactivating sterically hindered phenol, (D5c) a heat stabilizer/sterically hindered phenol, and (D5d) a triarylphosphite, wherein each of the (D5a) to (D5d) independently is at a total concentration from 0.05 wt % to 2 wt %, alternatively 0.1 wt % to 1 wt %; (D6) at least one processing aid at a total concentration from 0.05 wt % to 2 wt %, alternatively 0.1 wt % to 1 wt %; wherein total concentration is based on total weight of the formulation.

In some aspects (D) at least one additive is a combination of the (D1a), (D1b), (D2a), (D3a), (D4a), (D4b-1), (D5a-1) to (D5d-1), and (D6a), wherein: (D1a) piperazine pyrophosphate and (D1b) phosphoric acid (together, e.g., Adeka ADK STAB FP2100JC) is at a total concentration of 30 wt % in the formulation; (D2a) zinc oxide is at a concentration of wt % in the formulation; (D3a) N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N'N''-dibutyl-N'N''-bis(1,2,2,6,6-pentamethyl-4-piperidinyl)-1,3,5-triazine-2,4,6-triamine (CAS No. 106990-43-6; e.g., Chimassorb 119) is at a concentration of 2 wt % in the formulation; (D4a) titanium dioxide is at a concentration of 2 wt % in the formulation; (D4b-1) the carbon black masterbatch (e.g., DFDG-6059 from The Dow Chemical Company) is at a concentration of 0.05 wt % in the formulation; (D5a-1) pentaerythritol tetrakis(3-(3,5-di-tert-butyl-4-hydroxyphenyl)propionate (e.g., Irganox 1010) is at a concentration of 0.5 wt % in the formulation, (D5b-1) 2',3-bis[[3-[3,5-di-tert-butyl-4-hydroxyphenyl]propionyl]]propionohydrazide (e.g., Irganox MD 1024) is at a concentration of 0.2 wt % in the formulation, (D5c-1) a combination of dioctadecyl 3,3'-thiodipropionate and a tetrakis(3-(3,5-di-tert-butyl-4-hydroxyphenyl) propionate (e.g., the combination is Irganox PS 802 FL) is at a concentration of 0.2 wt % in the formulation, (D5d-1) tris(2,4-di-tert-butylphenyl)phosphite (e.g., Irgafos 168) is at a concentration of 0.1 wt % in the formulation; and (D6a) a fluorothermoplastic (e.g., Dynamar FX5912) is at a concentration of 0.02 wt % in the formulation; and wherein the total amount of constituent (D) at least one additive is 36 wt % of the formulation.

The formulation may be referred to as an unfilled formulation when constituent (D) at least one additive is absent therefrom. The formulation may be referred to as a filled formulation when the formulation further comprises constituent (D) at least one additive. Embodiments of the unfilled formulation may be made by any suitable means. For example, embodiments of the unfilled formulation that contain constituents (A) and (B), and optionally constituent (C), (but typically not constituent (D1) to (D6)) may be made in a Brabender batch mixer by blending the constituents for 3 minutes at 180° C. melt temperature using cam blades at 30 rotations per minute (rpm) to give an unfilled melt mixture, and then allowing the unfilled melt mixture to cool to give the embodiments of the unfilled formulation.

Embodiments of the filled formulation may also be made by any suitable means. For example, embodiments of the filled formulations containing constituents (A), (B), and at least one of constituent (D), and optionally constituent (C), may be made in a Brabender batch mixer using a 180° C. melt temperature by first adding the constituents (A) and (B), and constituent (C), if any, into the mixer. Once the constituents (A) and (B), and any constituent (C), has started melting, then add one or more of constituent(s) (D5) at least one antioxidant, followed by any other additives (D1), (D2), (D3), (D4), and/or (D6), at flux to give a filled melt mixture. Then homogenize the filled melt mixture for about 3 minutes, and allow the melt mixture to cool to give the embodiments of the filled formulation.

Test samples of embodiments of unfilled and filled formulations may be separately made into compression molded plaques. The mechanical properties of these formulations may be characterized using test samples cut from the compression molded plaques.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

"Olefin block copolymer" or "OBC" is an ethylene/α-olefin multi-block copolymer prepared from ethylene and one or more copolymerizable α-olefin comonomers and characterized by multiple blocks or segments of two or more polymerized monomer units differing in chemical or physical properties. The terms "interpolymer" and "copolymer" are used interchangeably herein. In some embodiments, the multi-block copolymer can be represented by the following formula $(AB)_n$, wherein subscript n is an integer of at least 1, e.g., 2, 3, 4, 5, 10, 15, 20, 50, 100, or higher; block A represents a hard block or segment and block B represents a soft block or segment. The A blocks and B blocks may be randomly distributed in a substantially linear arrangement, in contrast to a branched or star-shaped arrangement. The OBCs usually do not have a structure such as AAA-AA-BBB-BB and usually are free of a third type of block (e.g., lack a C block).

The OBC includes various amounts of "hard" segments and various amounts of "soft" segments that together may add to 100 wt %. Hard segments are blocks of polymerized units in which 95 to 100 wt %, alternatively 98 to 100 wt %, alternatively 98 to <100 wt % are ethylene-based units and 0 to 5 wt %, alternatively 0 to 2 wt %, alternatively >0 to 2 wt % are comonomer-based (alpha-olefin-based) units. Soft segments are blocks of polymerized units in which >5 to 70 wt %, alternatively >8 wt %, alternatively >10 wt %, alternatively >20 wt %, alternatively >30 wt %; and alternatively at most 60 wt %, alternatively at most 50 wt % are comonomer-based (alpha-olefin-based) units; and the balance are ethylene-based units. The soft segments may be from 1 to 99 wt %, alternatively ≥5 wt %, alternatively ≥10 wt %, alternatively ≥15 wt %, alternatively ≥20 wt %, alternatively ≥25 wt % of the OBC; and alternatively ≤95 wt %, alternatively ≤90 wt %, alternatively ≤85 wt %, alternatively ≤80 wt %, alternatively ≤75 wt % of the OBC, based on total weight of the OBC. Conversely, the hard segments may be from 99 to 1 wt %, alternatively ≤95 wt %, alternatively ≤90 wt %, alternatively ≤85 wt %, alternatively ≤80 wt %, alternatively ≤75 wt %; and alternatively ≥5 wt %, alternatively ≥10 wt %, alternatively ≥15 wt %, alternatively ≥20 wt %, alternatively ≥25 wt % of the OBC, based on total weight of the OBC.

"Crystalline" and "semicrystalline" refer to a first order transition melting point ($T_m$) of a polymer and is determined by differential scanning calorimetry (DSC). "Amorphous" means lacking a crystalline melting point as determined by DSC.

"Multi-block copolymer" or "segmented copolymer" is a polymer comprising two or more chemically distinct regions or segments (referred to as "blocks"). The blocks may be chemically differentiated segments that are joined end-to-end with respect to ethylenic functionality, rather than in a pendent or grafted arrangement. The blocks may differ in the amount or type of incorporated comonomer, density, amount of crystallinity, crystallite size attributable to a polymer of such composition, type or degree of tacticity (e.g., isotactic or syndiotactic), region-regularity or region-irregularity, amount of branching (including long chain branching or hyper-branching), homogeneity or any other chemical or physical property. Compared to non-OBC block interpolymers, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, which characteristics may be to effect(s) of reagents used in OBC's preparation, e.g., shuttling agent(s) in combination with multiple catalysts used in their preparation.

More OBC description is in US 2015/0259524 A1, e.g., paragraphs [0033] to [0049].

Unless otherwise defined herein, named general terms have the following meanings. Alternatively precedes a distinct embodiment. Articles "a", "an", and "the" each refer to one or more. ASTM means the standards organization, ASTM International, West Conshohocken, Pa., USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. unless indicated otherwise. Substituted when referring to a compound means having, in place of hydrogen, one or more substituents, up to and including per substitution.

EXAMPLES

Constituent (A1): DE 2400.05. The Dow Chemical Company.
Constituent (B1): OBC-3 (INFUSE™ 9010).
Constituent (C1): KN-501. Braskem S. A.
Constituents (D1a) and (D1b): Adeka ADK STAB FP2100JC.
Constituent (D2a): zinc oxide.
Constituent (D3a): Chimassorb 119.
Constituent (D4a): titanium dioxide.
Constituent (D4b-1): DFDG-6059. The Dow Chemical Company.
Constituent (D5a-1): Irganox 1010.
Constituent (D5b-1): Irganox MD 1024.
Constituent (D5c-1): Irganox PS 802 FL.
Constituent (D5d-1): Irgafos 168.
Constituent (D6a): Dynamar FX5912.
5% Secant Modulus: determine according to the 5%-Secant Modulus Test Method.

Unfilled Formulation Examples Containing Constituent (C)

Comparative Examples (CE) 1A and 1B: unfilled formulations consisting of constituents (A1) and (C1) or (B1) and (C1), respectively. Compositions and 5% Secant Modulus (5% SM) data are shown later in Table 1.

Inventive Example (IE) 1: unfilled formulation consisting of constituents (A1), (B1), and (C1). Composition and 5% Secant Modulus (5% SM) datum are shown below in Table 1.

TABLE 1

CE1A, CE1B, and IE1.

| | Ex. No. | | |
|---|---|---|---|
| | CE1A | CE1B | IE1 |
| (A1) | 90 | 0 | 45 |
| (B1) | 0 | 90 | 45 |
| (C1) | 10 | 10 | 10 |
| 5% SM | 4078 psi | 3203 psi | 4534 psi |
| Weighted Average 5% SM | | 3641 psi | N/m* |
| Stiffness Enhancement | | N/m | +24.5% |

N/m = not meaningful.

The data in Table 1 show the enhanced stiffness of the formulation of 1E1 relative to the weighted average stiffness of CE1A+CE1b for unfilled formulations containing constituent (C).

Filled Formulation Examples Lacking Constituent (C)

Comparative Examples (CE) 2A and 2B: filled formulations consisting of constituents (A1) or (B1), respectively, plus constituents (D1a), (D1b), (D2a), (D3a), (D4a), (D4b-1), (D5a-1), (D5b-1), (D5c-1), (D5d-1), and (D6a). Compositions and 5% Secant Modulus (5% SM) data are shown later in Table 2.

Inventive Examples (IE) 2 to 4: filled formulations consisting of constituents (A1), (B1), plus (D1a), (D1b), (D2a), (D3a), (D4a), (D4b-1), (D5a-1), (D5b-1), (D5c-1), (D5d-1), and (D6a). Compositions and 5% Secant Modulus (5% SM) data are shown below in Table 2.

TABLE 2

CE2A, CE2B, and IE2 to IE4.

| | Ex. No. | | | | |
|---|---|---|---|---|---|
| | CE2A | CE2B | IE2 | IE3 | IE4 |
| (A1) | 63.93 | 0 | 47.95 | 31.97 | 15.98 |
| (B1) | 0 | 63.93 | 15.98 | 31.97 | 47.95 |
| (D1a) + (D1b) | 30.00 | 30.00 | 30.00 | 30.00 | 30.00 |
| (D2a) | 1.00 | 1.00 | 1.00 | 1.00 | 1.00 |
| (D3a) | 2.00 | 2.00 | 2.00 | 2.00 | 2.00 |
| (D4a) | 2.00 | 2.00 | 2.00 | 2.00 | 2.00 |
| (D4b-1) | 0.05 | 0.05 | 0.05 | 0.05 | 0.05 |
| (D5a-1) | 0.50 | 0.50 | 0.50 | 0.50 | 0.50 |
| (D5b-1) | 0.20 | 0.20 | 0.20 | 0.20 | 0.20 |
| (D5c-1) | 0.20 | 0.20 | 0.20 | 0.20 | 0.20 |
| (D5d-1) | 0.10 | 0.10 | 0.10 | 0.10 | 0.10 |
| (D6a) | 0.02 | 0.02 | 0.02 | 0.02 | 0.02 |
| 5% SM | 4935 | 4221 | 4995 | 5422 | 5883 |
| Weighted Average 5% SM | | N/m | 4757 | 4578 | 4400 |
| Stiffness Enhancement | | N/m | +5.0% | +18.4% | +33.7% |

The data in Table 2 show the enhanced stiffness of the formulations of IE2 to IE4, at weight/weight proportions of constituent (A) to constituent (B) varying from 3:1 wt/wt for IE2 to 1:1 wt/wt for 1E3, to 1:3 wt/wt for IE4, and relative to the weighted average stiffness of CE2A+CE2b for filled formulations lacking constituent (C).

Filled Formulation Examples Containing Constituent (C)

Comparative Examples (CE) 3A and 3B, 4A and 4B, 5A and 5B, and 6A and 6B: filled formulations consisting of constituents (A1) and (C1) or (B1) and (C1), respectively, plus constituents (D1a), (D1b), (D2a), (D3a), (D4a), (D4b-1), (D5a-1), (D5b-1), (D5c-1), (D5d-1), and (D6a). Compositions and 5% Secant Modulus (5% SM) data are shown later in Tables 3 and 4.

Inventive Examples (IE) 5 to 8: filled formulation consisting of constituents (A1) and (B1), and (C1), plus constituents (D1a), (D1b), (D2a), (D3a), (D4a), (D4b-1), (D5a-1), (D5b-1), (D5c-1), (D5d-1), and (D6a). Compositions and 5% Secant Modulus (5% SM) data are shown below in Tables 3 and 4.

TABLE 3

CE3A, CE3B, CE4A, CE4B, IE5 and IE6.

| Ex. No. | CE3A | CE3B | IE5 | CE4A | CE4B | IE6 |
|---|---|---|---|---|---|---|
| (A1) | 57.54 | 0 | 28.77 | 51.15 | 0 | 25.57 |
| (B1) | 0 | 57.54 | 28.77 | 0 | 51.15 | 25.57 |
| (C1) | 6.39 | 6.39 | 6.39 | 12.79 | 12.79 | 12.79 |
| (D1a) + (D1b) | 30.00 | 30.00 | 30.00 | 30.00 | 30.00 | 30.00 |
| (D2a) | 1.00 | 1.00 | 1.00 | 1.00 | 1.00 | 1.00 |
| (D3a) | 2.00 | 2.00 | 2.00 | 2.00 | 2.00 | 2.00 |
| (D4a) | 2.00 | 2.00 | 2.00 | 2.00 | 2.00 | 2.00 |
| (D4b-1) | 0.05 | 0.05 | 0.05 | 0.05 | 0.05 | 0.05 |
| (D5a-1) | 0.50 | 0.50 | 0.50 | 0.50 | 0.50 | 0.50 |
| (D5b-1) | 0.20 | 0.20 | 0.20 | 0.20 | 0.20 | 0.20 |
| (D5c-1) | 0.20 | 0.20 | 0.20 | 0.20 | 0.20 | 0.20 |
| (D5d-1) | 0.10 | 0.10 | 0.10 | 0.10 | 0.10 | 0.10 |
| (D6a) | 0.02 | 0.02 | 0.02 | 0.02 | 0.02 | 0.02 |
| 5% SM | 6387 psi | 5342 psi | 6265 psi | 7632 psi | 6040 psi | 8897 psi |
| Weighted Average 5% SM | 5865 psi | | N/m* | 6836 psi | | N/m |
| Stiffness Enhancement | N/m | | +6.8% | N/m | | +30.1% |

The data in Table 3 show the enhanced stiffness of the formulation of 1E5 relative to the weighted average stiffness of CE3A+CE3b and the enhanced stiffness of the formulation of 1E6 relative to the weighted average stiffness of CE4A+CE4b, all for filled formulations containing varying concentrations of constituent (C).

TABLE 4

CE5A, CE5B, CE6A, CE6B, IE7 and IE8.

| Ex. No. | CE5A | CE5B | IE7 | CE6A | CE6B | IE8 |
|---|---|---|---|---|---|---|
| (A1) | 44.75 | 0 | 22.38 | 38.36 | 0 | 19.18 |
| (B1) | 0 | 44.75 | 22.38 | 0 | 38.36 | 19.18 |
| (C1) | 19.18 | 19.18 | 19.18 | 25.57 | 25.57 | 25.57 |
| (D1a) + (D1b) | 30.00 | 30.00 | 30.00 | 30.00 | 30.00 | 30.00 |
| (D2a) | 1.00 | 1.00 | 1.00 | 1.00 | 1.00 | 1.00 |
| (D3a) | 2.00 | 2.00 | 2.00 | 2.00 | 2.00 | 2.00 |
| (D4a) | 2.00 | 2.00 | 2.00 | 2.00 | 2.00 | 2.00 |
| (D4b-1) | 0.05 | 0.05 | 0.05 | 0.05 | 0.05 | 0.05 |
| (D5a-1) | 0.50 | 0.50 | 0.50 | 0.50 | 0.50 | 0.50 |
| (D5b-1) | 0.20 | 0.20 | 0.20 | 0.20 | 0.20 | 0.20 |
| (D5c-1) | 0.20 | 0.20 | 0.20 | 0.20 | 0.20 | 0.20 |
| (D5d-1) | 0.10 | 0.10 | 0.10 | 0.10 | 0.10 | 0.10 |
| (D6a) | 0.02 | 0.02 | 0.02 | 0.02 | 0.02 | 0.02 |
| 5% SM | 10609 psi | 7883 psi | 12164 psi | 16800 psi | 11773 psi | 15584 psi |
| Weighted Average 5% SM | 9246 psi | | N/m* | | psi | N/m |
| Stiffness Enhancement | N/m | | +31.6% | N/m | | +9.1% |

Like Table 3, the data in Table 4 show the enhanced stiffness of the formulation of 1E7 relative to the weighted average stiffness of CE5A+CE5b and the enhanced stiffness of the formulation of 1E8 relative to the weighted average stiffness of CE6A+CE6b, all for filled formulations containing varying concentrations of constituent (C).

As shown in the examples, the inventive formulation has an unpredictable increase in stiffness relative to a mass-weighted average of stiffness of the constituents (A) and (B) alone. Further, the increase in stiffness for the inventive formulation is proportional to the concentration of constituent (B), which is the softer, more flexible constituent of the formulation than the constituent (A) (or constituent (C)). That is, all other things being equal, the higher the amount of the constituent (B) in the formulation relative to the amount of the constituent (A) in the formulation, the greater the increase in stiffness. Also, the synergistic or enhanced increase in stiffness of the formulation may be further enhanced or increased by replacing a portion of the constituents (A) and (B) in the formulation with constituent (C), such as a heterophasic polypropylene material. This further enhancement with polypropylene, a harder, less flexible constituent than the foregoing portions of the constituents (A) and (B) it replaces, also was unpredictable.

Incorporate by reference here the below claims as numbered aspects except replace "claim" and "claims" by "aspect" or "aspects," respectively.

The invention claimed is:

1. A formulation comprising constituent (A) a poly(propylene-co-ethylene) elastomer copolymer having an isotactic segment distribution and constituent (B) a poly(ethylene-co-1-octene) block copolymer having alternating blocks of hard segments and soft segments, and further comprising a constituent (C) a heterophasic polypropylene material, wherein the formulation has a greater 5%-secant modulus than a mass-weighted average of 5%-secant modulus of the (A) poly(propylene-co-ethylene) elastomer and 5%-secant modulus of the (B) poly(ethylene-co-1-octene) block copolymer, when tested according to 5%-Secant Modulus Test Method; wherein the (C) heterophasic polypropylene material is from 1 wt % to 40 wt % of the formulation; and wherein the (C) heterophasic polypropylene material comprises (C1) a poly(ethylene-co-propylene) elastomer copolymer dispersed in a homopolypropylene matrix, wherein the poly(ethylene-co-propylene) elastomer copolymer is from 5 wt % to 30 wt % of the (C1) heterophasic polypropylene material.

2. The formulation of claim 1 wherein: (i) the (A) poly(propylene-co-ethylene) elastomer copolymer has a total ethylene-based content of from 1 wt % to 15 wt % based on weight of the poly(propylene-co-ethylene) elastomer copolymer; (ii) the (A) poly(propylene-co-ethylene) elastomer copolymer is has a melt flow rate (MFR) of 0.2 to 3 decigrams per minute (dg/min) as measured by ASTM D1238 (230 degrees Celsius (° C.) per 2.16 kilograms (kg)) and a density of 0.855 to 0.875 grams per cubic centimeter (g/cc) as measured by ASTM D792; (iii) both (i) and (ii); (iv) the (B) poly(ethylene-co-1-octene) block copolymer has a total ethylene-based content of from 59 wt % to 75 wt % based on weight of the (B) poly(ethylene-co-1-octene) block copolymer and the (B) poly(ethylene-co-1-octene) block copolymer comprises 8 wt % to 30 wt % of a hard segment and 92 wt % to 70 wt % of a soft segment, wherein the soft segment has a 1-octene-based content of from 8 mole percent (mol %) to 20 mol % based on total moles of the monomer-based content of the soft segment; (v) the (B) poly(ethylene-co-1-octene) block copolymer has a melt index (MI) of 0.2 grams/10 minutes (g/10 min) to 2 g/10 min as measured by ASTM D1238 (190° C. per 2.16 kg) and a density of 0.870 to 0.890 g/cc as measured by ASTM D792; (vi) both (iv) and (v); or (vii) both (iii) and (vi).

3. The formulation of claim 1 wherein: (i) the (A) poly(propylene-co-ethylene) elastomer copolymer is from 1 weight percent (wt %) to 99 wt %, and the (B) poly(ethylene-co-1-octene) block copolymer is from 99 wt % to 1 wt %, respectively, of the combined weight of the constituents (A) and (B); (ii) the (A) poly(propylene-co-ethylene) elastomer copolymer is from 10 wt % to 90 wt %, and the (B) poly(ethylene-co-1-octene) block copolymer is from 90 wt % to 10 wt %, respectively, of the combined weight of the constituents (A) and (B); (iii) the (A) poly(propylene-co-ethylene) elastomer copolymer is from 20 wt % to 80 wt %, and the (B) poly(ethylene-co-1-octene) block copolymer is from 80 wt % to 20 wt %, respectively, of the combined weight of the constituents (A) and (B); or (iv) the poly(propylene-co-ethylene) elastomer copolymer is from 25 wt % to 75 wt %, and the poly(ethylene-co-1-octene) block copolymer is from 75 wt % to 25 wt %, respectively, of the combined weight of the constituents (A) and (B).

4. The formulation of claim 1 further comprising a constituent (D) at least one additive, wherein the (C) heterophasic polypropylene material is from 15 wt % to 35 wt % of the formulation and the (D) at least one additive is from 0.01 wt % to 40 wt % of the formulation; wherein each wt % is based on total weight of the formulation.

5. The formulation of claim 4 wherein the (D) at least one additive is selected from: (D1) an intumescent flame retardant and/or (D2) a flame retardant enhancer, at a total concentration from 0.1 wt % to 70 wt %; (D3) at least one hindered amine light stabilizer (HALS) at a total concentration from 0.01 wt % to 10 wt %; (D4) at least one ultraviolet (UV) light absorbent filler at a total concentration from 0.1 wt % to 10 wt %; (D5) at least one antioxidant selected from (D5a) a sterically hindered phenol, (D5b) a metal deactivating sterically hindered phenol, (D5c) a heat stabilizer/sterically hindered phenol, and (D5d) a triarylphosphite, wherein each of the (D5a) to (D5d) independently is at a total concentration from 0.01 wt % to 3 wt %; (D6) at least one processing aid at a total concentration from 0.01 wt % to 5 wt %; and (D7) each of (D1) to (D6).

6. The formulation of claim 5 wherein in the (D) at least one additive: the (D1) the intumescent flame retardant is a combination of (D1a) piperazine pyrophosphate and (D1b) phosphoric acid and the (D2) flame retardant enhancer is (D2a) zinc oxide; (D3) the at least one HALS is (D3a) N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N'N''-dibutyl-N'N''-bis(1,2,2,6,6-pentamethyl-4-piperidinyl)-1,3,5-triazine-2,4,6-triamine; (D4) the at least one UV light absorbent filler is (D4a) titanium dioxide and/or (D4b) a carbon black; (D5) the at least one antioxidant is selected from (D5a-1) pentaerythritol tetrakis(3-(3,5-di-tert-butyl-4-hydroxyphenyl)propionate, (D5b-1) 2',3-bis[[3-[3,5-di-tert-butyl-4-hydroxyphenyl]propionyl]]propionohydrazide, (D5c-1) a combination of dioctadecyl 3,3'-thiodipropinate and a tetrakis(3-(3,5-di-tert-butyl-4-hydroxyphenyl)propionate, and (D5d-1) tris(2,4-di-tert-butylphenyl)phosphite; (D6) the at least one processing aid is (D6a) a fluorothermoplastic; (D7a) each of (D1a), (D1b), (D2a), (D3a), (D4a), (D4b), (D5a-1) to (D5d-1), and (D6a); and wherein the total amount of constituent (D) at least one additive is from 30 to 40 wt % of the formulation.

7. The formulation of claim 6 wherein the (D4b) carbon black is (D4b-1) a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the masterbatch); and/or wherein the total amount of the (D) at least one additive is from 35 to 37 wt % based on total weight of the formulation.

8. The formulation of claim 1 wherein: (i) the 5%-secant modulus of the formulation is at least 5 percent (%) greater than the mass-weighted average of 5%-secant modulus of the (A) poly(propylene-co-ethylene) elastomer copolymer and 5%-secant modulus of the (B) poly(ethylene-co-1-octene) block copolymer; (ii) the 5%-secant modulus of the formulation is at least 10% greater than the mass-weighted average of 5%-secant modulus of the (A) poly(propylene-co-ethylene) elastomer copolymer and 5%-secant modulus of the (B) poly(ethylene-co-1-octene) block copolymer; (iii) the 5%-secant modulus of the formulation is at least 20% greater than the mass-weighted average of 5%-secant modulus of the (A) poly(propylene-co-ethylene) elastomer copolymer and 5%-secant modulus of the (B) poly(ethylene-co-1-octene) block copolymer; (iv) the 5%-secant modulus of the formulation is at least 30% greater than the mass-weighted average of 5%-secant modulus of the (A) poly(propylene-co-ethylene) elastomer copolymer and 5%-secant modulus of the (B) poly(ethylene-co-1-octene) block copolymer; (v) the 5%-secant modulus of the formulation is at most 35% greater than the mass-weighted average of 5%-secant modulus of the (A) poly(propylene-co-ethylene) elastomer copolymer and 5%-secant modulus of the (B) poly(ethylene-co-1-octene) block copolymer; (vi) both (v) and any one of (i) to (iv).

9. A method of making a formulation having an enhanced 5%-secant modulus, the method comprising (1) melting and mixing constituent (A) a poly(propylene-co-ethylene) elastomer copolymer having an isotactic segment distribution and constituent (B) a poly(ethylene-co-1-octene) block copolymer having alternating blocks of hard segments and soft segments, and constituent (C) a heterophasic polypropylene material and optionally a constituent (D) at least one additive, to give a melt of constituents (A) and (B) and, constituent (C), and optionally filled with constituent (D) at least one additive; and (2) allowing the melt to cool to give a formulation comprising the constituents (A) and (B), and the constituent (C) and optionally constituent (D), wherein the formulation has a greater 5%-secant modulus than a mass-weighted average of 5%-secant modulus of the (A) poly(propylene-co-ethylene) elastomer copolymer and 5%-secant modulus of the (B) poly(ethylene-co-1-octene) block copolymer, when tested according to 5%-Secant Modulus Test Method;

wherein when the formulation is free of constituent (D), the (C) heterophasic polypropylene material is from 1 wt % to 40 wt % of the formulation, and when the formulation further comprises constituent (D), the (C) heterophasic polypropylene material is from 15 wt % to 35 wt % of the formulation and the (D) at least one additive is from 0.01 wt % to 40 wt % of the formulation; and wherein the (C) heterophasic polypropylene material comprises (C1) a poly(ethylene-co-propylene) elastomer copolymer dispersed in a homopolypropylene matrix, wherein the poly(ethylene-co-propylene) elastomer copolymer is from 5 wt % to 30 wt % of the (C1) heterophasic polypropylene material.

10. A manufactured article comprising a shaped form of the formulation of claim 1.

11. A coated conductor comprising a conductive core and a polymeric layer at least partially surrounding the conductive core, wherein at least a portion of the polymeric layer comprises or is prepared from the formulation of claim 1.

12. A method of conducting electricity, the method comprising applying a voltage across the conductive core of the coated conductor of claim 11 so as to generate a flow of electricity through the conductive core.

* * * * *